United States Patent [19]

Ejiri et al.

[11] Patent Number: 5,379,683
[45] Date of Patent: Jan. 10, 1995

[54] COOKER

[75] Inventors: Susumu Ejiri, Toyoake; Makoto Kimura, Inazawa; Hajime Hiraoka, Aichi, all of Japan

[73] Assignee: Paloma Kogyo Kabushiki Kaisha, Nagoya, Japan

[21] Appl. No.: 28,335

[22] Filed: Mar. 9, 1993

[30] Foreign Application Priority Data

Mar. 16, 1992 [JP] Japan .................. 4-022956[U]

[51] Int. Cl.⁶ .............................................. A47J 37/12
[52] U.S. Cl. ........................................ 99/331; 99/403; 126/374; 126/391; 219/442; 219/492; 431/1
[58] Field of Search .................... 99/330, 331, 403; 126/351, 374, 391; 431/1; 219/435, 441, 442, 492

[56] References Cited

U.S. PATENT DOCUMENTS

| | | | |
|---|---|---|---|
| 3,894,483 | 7/1975 | Anetsberger et al. | 99/331 |
| 3,938,498 | 2/1976 | Price | 99/403 |
| 3,960,137 | 6/1976 | Schmid | 99/331 |
| 3,977,390 | 8/1976 | Fogel et al. | 99/331 |
| 4,091,801 | 5/1978 | Lazaridis et al. | 126/391 |
| 4,278,872 | 7/1981 | Koether et al. | 99/330 |
| 4,282,423 | 8/1981 | Volz | 99/330 |
| 4,437,159 | 3/1984 | Waugh | 364/400 |
| 4,549,527 | 10/1985 | Davis | 126/374 |
| 4,845,341 | 7/1989 | Rae | 219/492 |
| 4,949,703 | 8/1990 | Ejiri et al. | 126/360 R |
| 5,038,676 | 8/1991 | Davis et al. | 99/331 |
| 5,090,305 | 2/1992 | Lehman | 99/403 |

FOREIGN PATENT DOCUMENTS

| | | |
|---|---|---|
| 62-60526 | 3/1987 | Japan . |
| 2298322 | 12/1987 | Japan .................................. 99/403 |
| 2-36709 | 3/1990 | Japan . |
| 5-25127 | 4/1993 | Japan . |

OTHER PUBLICATIONS

Japanese Brochure of Various Cooking Devices, Nov. 1992.

Primary Examiner—Mark Spisich
Attorney, Agent, or Firm—Lahive & Cockfield

[57] ABSTRACT

An improved cooking apparatus or cooker which heats and cooks food items in a cooking liquid medium by effectively controlling the temperature of the liquid medium. The cooker starts forcible combustion irrespective of the temperature of the liquid medium detected by a temperature sensor when the operator presses a forcible combustion switch. This system minimizes a time lag between placing food items into the cooking liquid medium and start of combustion, which is attributable to the uneven temperature distribution and convection of the cooking liquid medium, thus efficiently reducing undesirable temperature drop of the cooking liquid medium due to cold food items. Alternatively, the cooker determines presence of food items in the cooking liquid medium according to the downward slope in temperature instead of a press of the forcible combustion switch and automatically starts forcible combustion.

18 Claims, 4 Drawing Sheets

COOKER

BACKGROUND OF THE INVENTION

1. Field of the Invention

The present invention relates to a cooker for heating and cooking food items in a cooking liquid medium such as water or oil.

2. Description of the Related Art

In cooking apparatus such as fryer apparatus and noodle cookers for cooking food items in a cooking liquid medium, determination of the appropriate heating temperature is essential for desirable cooking of food items. For example, a fryer apparatus detects the temperature in cooking oil and controls combustion conditions of a combustor so as to maintain the oil temperature within a predetermined range. Such temperature control is generally implemented through ON/OFF control of the combustor. The combustor starts combustion when the detected oil temperature drops below a predetermined lower limit, and the combustor stops combustion when the detected oil temperature rises over a predetermined upper limit. In this manner, the temperature in cooking oil is maintained within a predetermined range.

Food items are placed into a cooking liquid medium, for example, cooking oil, which is previously heated and maintained in a predetermined temperature range. In a conventional cooker like fryer apparatus, when food items are placed into the cooking oil under the combustion OFF conditions, the fryer apparatus can not resume combustion immediately, but there is a certain time delay before restart of combustion. The time lag is generally attributed to the temperature sensor which detects the drop in oil temperature below a predetermined value after some delay due to the uneven temperature distribution in cooking oil and convection of the oil in a frypot. The conventional system resumes combustion after the temperature in cooking oil around the cold food items falls undesirably, which may cause underdoing or overdoing of food items.

SUMMARY OF THE INVENTION

One object of the invention is to provide an improved cooking apparatus or cooker for desirably cooking food items.

Another object of the invention is to minimize a time lag between placing food items into a cooking liquid medium and start of heating.

A still another object of the invention is to provide an improved cooker which minimizes the abrupt temperature drop of the cooking liquid medium.

The above and other related objects are realized by a cooker of the invention which includes: a heating unit for heating a cooking liquid medium such as oil or water; a temperature detecting unit for detecting temperature of the cooking liquid medium; a temperature control unit for controlling the heating unit to start and stop heating based on the temperature of the cooking liquid medium detected by the temperature detecting unit so as to maintain the cooking liquid medium in a predetermined temperature range; and a forcible heating control unit for controlling the heating unit to start forcible heating irrespective of the temperature of the cooking liquid medium detected by the temperature detecting unit.

In the above cooker of the invention, the forcible heating control unit controls the heating unit to start forcible heating irrespective of the temperature of the cooking liquid medium. Even when the cooking liquid medium is maintained in a predetermined temperature range by the temperature control unit and is currently under the heating OFF conditions, the heating unit is driven to resume heating immediately by the forcible heating control unit. When cold food items are placed into the cooking liquid medium, the temperature detecting unit detects the temperature fall after some delay due to the uneven temperature distribution and convection of the cooking liquid medium and the response characteristics of the detecting unit, and meanwhile, the temperature in the cooking liquid medium unfavorably drops. The forcible heating control unit forces the heating unit to start heating regardless of the response delay of the temperature detecting unit and thus effectively reduces this unfavorable temperature fall.

Alternatively, the cooker of the invention includes a heating unit for heating a cooking liquid medium such as oil or water; a temperature detecting unit for detecting temperature of the cooking liquid medium; a temperature control unit for controlling the heating unit to start and stop heating based on the temperature of the cooking liquid medium detected by the temperature detecting unit so as to maintain the cooking liquid medium in a predetermined temperature range; a downward slope detecting unit for detecting a downward slope of the temperature in the cooking liquid medium; and an instruction unit for outputting a control signal to the heating unit to start forcible heating irrespective of the temperature of the cooking liquid medium detected by the temperature detecting unit when the downward slope detected by the downward slope detecting unit becomes equal to or greater than a predetermined first limit.

In the alternative structure of the invention, the instruction unit controls the heating unit to start forcible heating irrespective of the actual temperature of the cooking liquid medium, but according to the downward slope in temperature. Even when the cooking liquid medium is maintained in a predetermined temperature range by the temperature control unit and is currently under the heating OFF conditions, the instruction unit outputs a control signal to the heating unit to resume heating immediately. The instruction unit forces the heating unit to start heating regardless of the response delay of the temperature detecting unit and thus effectively reduces the unfavorable temperature fall due to cold food items.

The cooker of the invention may further include a restoration unit for outputting a restoration signal to the temperature control unit to resume normal heating control when the temperature in the cooking liquid medium drops below a predetermined value after start of forcible heating.

In this structure, the restoration unit automatically stops forcible heating and instructs the temperature control unit to resume normal heating control when the temperature in the cooking liquid medium becomes lower than a predetermined value after the forcible heating. When the predetermined value is set to be equal to the lower limit of the predetermined temperature range maintained by the temperature control unit, the normal heating control starts when the temperature of the liquid medium drops below the lower limit to continue heating. This automatic restoration system to the normal heating control makes the operator free from troublesome manual switching operation.

Alternatively, the cooker of the invention may include another restoration unit for outputting a restoration signal to the temperature control unit to resume normal heating control when a preset time period has elapsed since the start of forcible heating.

In this alternative structure, the restoration unit automatically stops forcible heating and instructs the temperature control unit to resume normal heating control when a preset time period has elapsed since the start of forcible heating. The restoration timing or the preset time period is determined by taking account of the temperature change in the cooking liquid medium due to forcible heating.

The cooker of the invention may include still another restoration unit for outputting a restoration signal to the temperature control unit to resume normal heating control when an upward slope of the temperature in the cooking liquid medium becomes equal to or greater than a predetermined second limit after start of forcible heating.

In this structure of the invention, the restoration unit automatically stops forcible heating and instructs the temperature control unit to resume normal heating control when an upward slope of the temperature becomes equal to or greater than a predetermined limit after start of forcible heating. When cold food items are placed into the cooking liquid medium, the temperature of the liquid medium drops abruptly in the first stage, but the forcible heating gradually reduces the downward slope in temperature and finally raises the temperature. When the temperature slope goes upward, the normal heating control is resumed. The restoration unit outputs a restoration signal to the temperature control unit at the timing corresponding to the variation in temperature. When forcible heating starts mistakenly without food items, the restoration unit stops the forcible heating based on the upward slope in temperature, thus efficiently preventing overheat of the cooking liquid medium.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
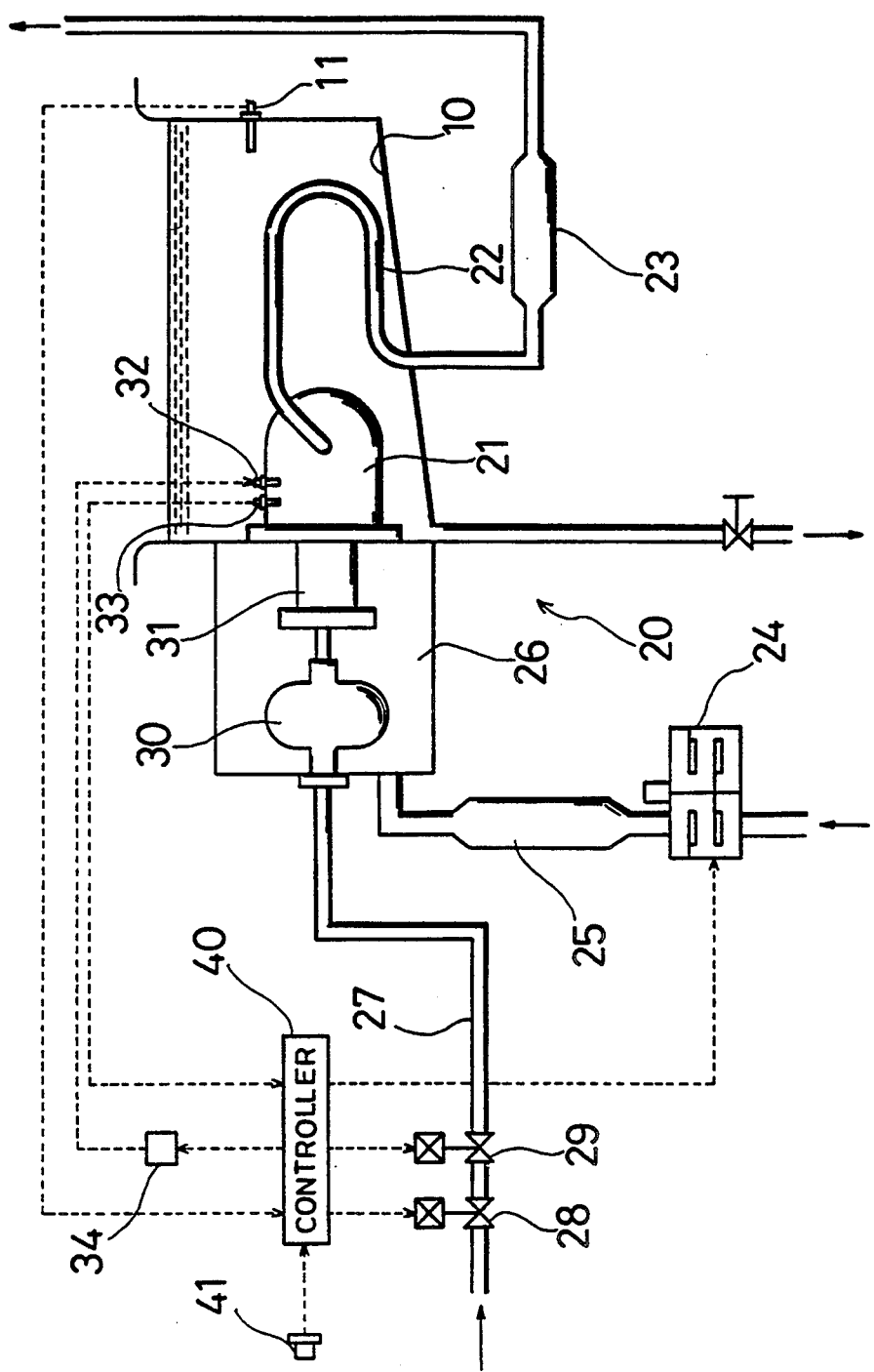
FIG. 1 is a view schematically illustrating a fryer apparatus embodying the invention.

FIG. 1 is a schematic view illustrating a fryer apparatus as a first embodiment of the invention. The fryer apparatus of the embodiment used for cooking or deep fat frying of food items such as french fries or breaded chickens includes: a frypot 10 which is filled with cooking liquid or oil; a pulse combustor 20 for heating the cooking oil in the frypot 10; and a combustion controller 40 for controlling combustion of the pulse combustor 20.

The pulse combustor 20 in the fryer apparatus has a combustion-exhaust system, an air supply system, and a fuel gas supply system.

The combustion-exhaust system includes: a combustion chamber 21 disposed in the frypot 10 for pulse combustion; a tail pipe 22 winding its way through the frypot 10 and constituting an exhaust conduit of hot combustion byproducts from the combustion chamber 21; and an exhaust muffler 23 formed in the middle of the tail pipe 22. The cooking oil in the frypot 10 is heated by thermal energy transmitted through the outside walls of the combustion chamber 21 and the tail pipe 22. A temperature sensor 11 for detecting the temperature of the cooking oil in the frypot 10 is attached to the side wall of the frypot 10.

The air supply system for supplying air to the combustion chamber 21 includes: a fan 24 for feeding the air for combustion; an intake muffler 25 connected to the fan 24; and an air chamber 26 coupled to the combustion chamber 21 for receiving the air fed through the intake muffler 25.

The fuel gas supply system includes: first and second electromagnetic valves 28 and 29 mounted in the middle of a gas conduit 27 for opening and closing a flow path of fuel gas; and a gas chamber 30 disposed in the air chamber 26.

In the air chamber 26, there is a mixing chamber 31 coupled with and connected to the gas chamber 30. The fuel gas is supplied into the mixing chamber 31 via the gas chamber 30 while the air being supplied thereto via the air chamber 26. The separately supplied fuel gas and air are mixed in the mixing chamber 31 and transmitted to the combustion chamber 21 as an air/fuel mixture. The combustion chamber 21 is provided with an ignition plug 32 for igniting the air/fuel mixture on the commencement of combustion, and a flame rod 33 for detecting the flame.

The pulse combustor 20 thus constructed repeats explosion and combustion at a fixed cycle by taking advantage of its automatic ignition and absorption characteristics at stationary combustion. In the first embodiment, a pair of check valves or flapper valves (not shown) are attached to the respective inlets of the fuel gas and the air to the mixing chamber 31 so as to prevent back flow of combustion exhaust into the fuel gas supply system and the air supply system.

The combustion controller 40 for controlling combustion of the pulse combustor 20 is constructed as a microcomputer including: a conventional arithmetic/logic/operation circuit consisting of a CPU or central processing unit, a ROM or reading only memory, and a RAM or random access memory, an input interface for inputting signals sent from the temperature sensor 11 and the flame rod 33, and an output interface for outputting control signals to the first and second electromagnetic valves 28 and 29, the fan 24, and an igniter 34. None of these elements are shown in the drawing of FIG. 1. The combustion controller 40 is further connected to a forcible combustion switch 41 which starts forcible combustion irrespective of the oil temperature detected by the temperature sensor 11.

Figure 2A:
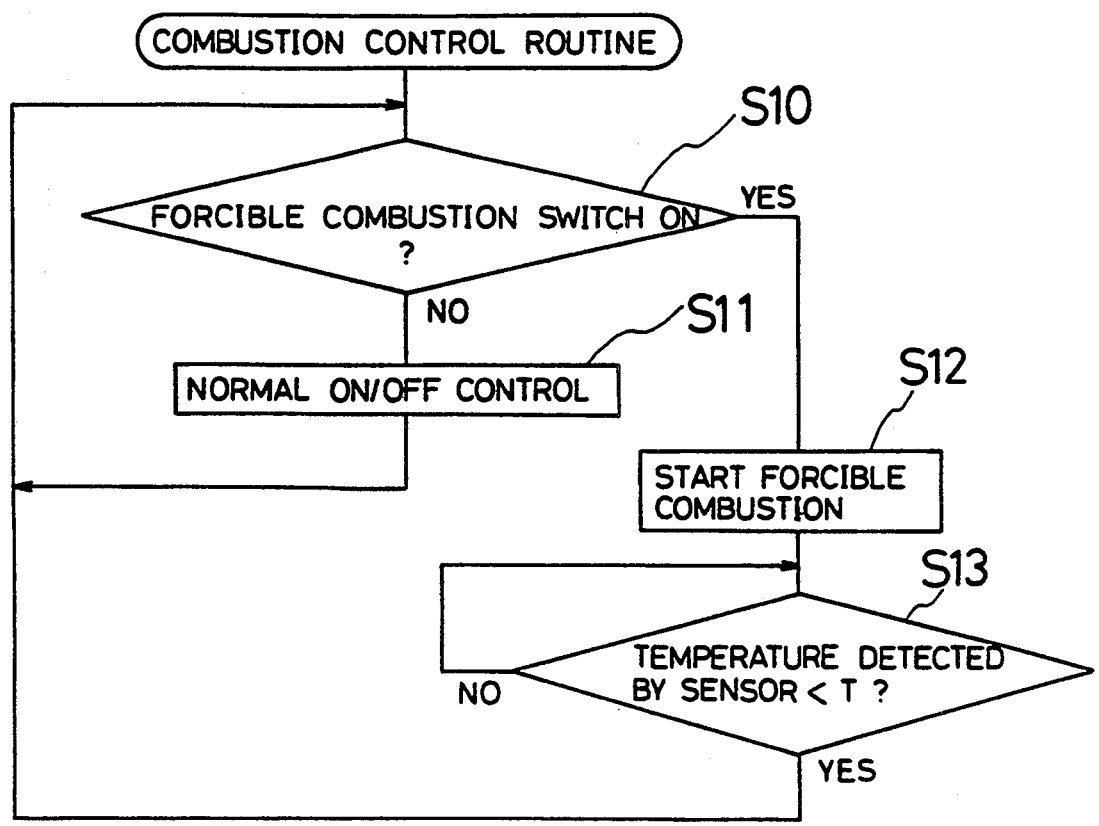
FIG. 2A is a flowchart showing a combustion control routine.

A combustion control routine executed by the fryer apparatus of the first embodiment is described according to the flowchart of FIG. 2A. Along with execution of the combustion control routine, the temperature sensor 11 detects the temperature of the cooking oil.

Under the normal combustion conditions, the combustion controller 40 starts and stops combustion (controls ON and OFF the combustion) to maintain the temperature of cooking oil within a predetermined range. When the combustion control routine starts, at step S10 it is determined whether the forcible combustion switch 41 is pressed. When the answer is NO at step S10, the program goes to step S11 where the combustion controller 40 continues normal ON/OFF control based on the output of the temperature sensor 11, that is, the temperature in cooking oil detected at a fixed cycle. In the fryer apparatus of this preferred embodiment, combustion starts when the temperature on the temperature sensor 11 falls below 180° C., and combustion stops when the temperature rises over 182° C. The temperature of the cooking oil is thus efficiently maintained in a range between 180° C. and 182° C.

Figure 4:
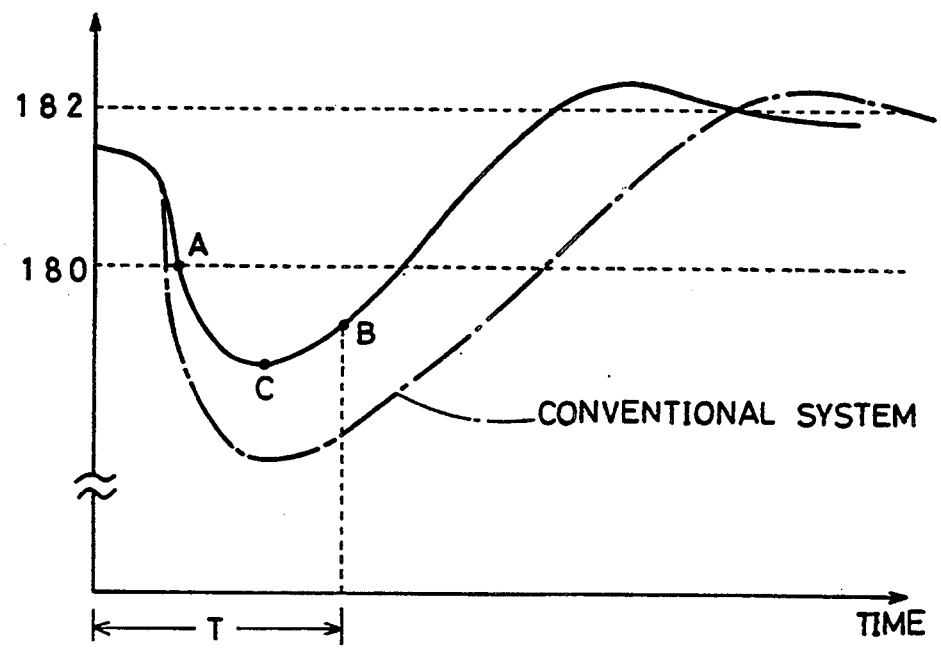
FIG. 4 is a graph showing the temperature change detected by the temperature sensor of FIG. 1 when the routine of FIGS. 2A, 2B, or 3A is executed.

Food items held on a food basket (not shown) are placed and deep fried in the cooking oil which is heated and maintained in the above predetermined range. The operator presses the forcible combustion switch 41 when placing food items in the cooking oil. A press of the forcible combustion switch 41 makes the program go to step S12 at which forcible combustion starts irrespective of the temperature on the temperature sensor 11 at the time of switch-on. Namely, forcible combustion starts even when the cooking oil is maintained in the predetermined temperature range and currently under the combustion OFF conditions. This efficiently solves the drawbacks of the response delay of the temperature sensor 11 due to the uneven temperature distribution and convection of cooking oil, and effectively reduces the undesirable temperature drop due to cold food items as clearly seen in the graph of FIG. 4 which shows comparison of the temperature change between this embodiment and a conventional system.

After forcible combustion starts at step S12, the program proceeds to step S13 at which the restoration timing to resume normal ON/OFF control is determined according to the temperature on the temperature sensor 11. More specifically, at step S13, the temperature on the temperature sensor 11 is compared with a predetermined temperature T (for example, 180° C.). When the measured temperature becomes lower than the predetermined temperature T, the program returns to step S10; that is, the combustion conditions are restored to normal ON/OFF control at a time point A in the graph of FIG. 4. The pulse combustor 20 continues combustion after the time point A, and stops combustion when the temperature detected by the temperature sensor 11 becomes greater than 182° C. This system of the first embodiment automatically resumes normal ON/OFF control, and makes the operator free from troublesome manual switching operation.

Figure 2B:
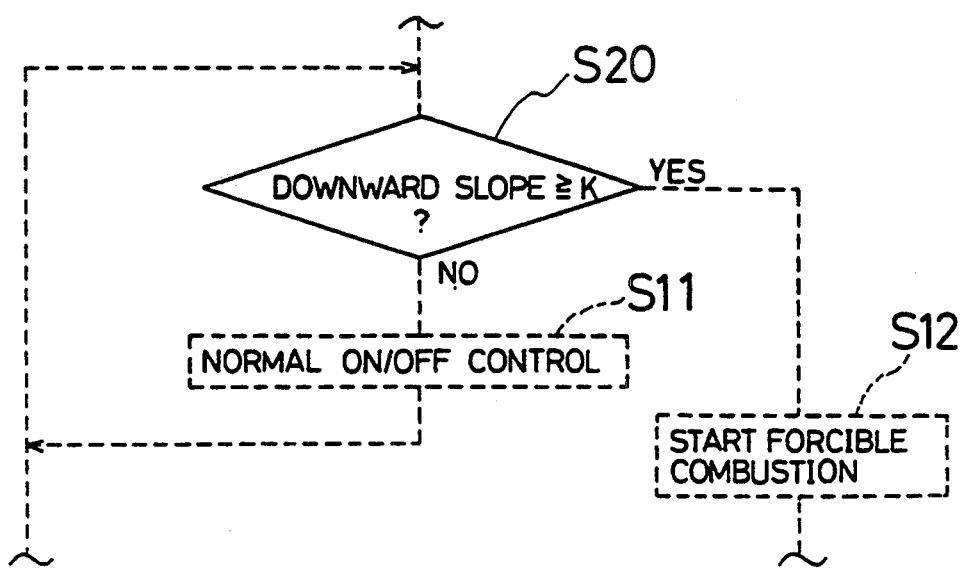
FIG. 2B is a flowchart showing another combustion control routine.

Another combustion control routine executed by a fryer apparatus of a second embodiment is described according to the flowchart of FIG. 2B. The fryer apparatus of the second embodiment does not include the forcible combustion switch 41 which is included in the first embodiment. In the combustion control routine of this embodiment, forcible combustion automatically starts based on the downward slope of the detected temperature. The routine of the second embodiment shown in FIG. 2B includes step S20 in place of step S10 of FIG. 2A. When the downward slope (°C./second) of the temperature detected at a fixed cycle becomes equal to or greater than a preset limit K, that is, when the oil temperature abruptly drops, the combustion controller 40 determines presence of food items in the cooking oil and instructs the pulse combustor 20 to start forcible combustion. The system of the second embodiment efficiently reduces the undesirable temperature fall due to cold food items, and furthermore makes the operator free from troublesome manual switch-on operation to improve usability of the fryer apparatus.

Figure 3:
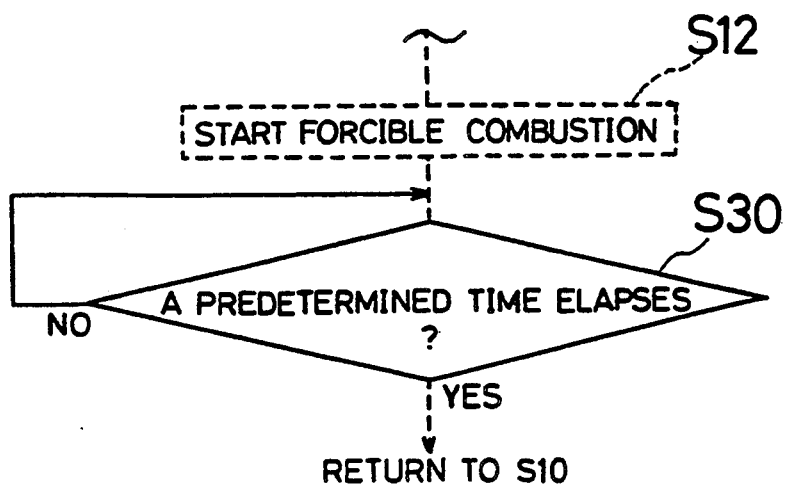
FIG. 3A is a flowchart showing another restoration step for resuming normal ON/OFF control.
FIG. 3B is a flowchart showing still another restoration step for resuming normal ON/OFF control.
Figure 3:
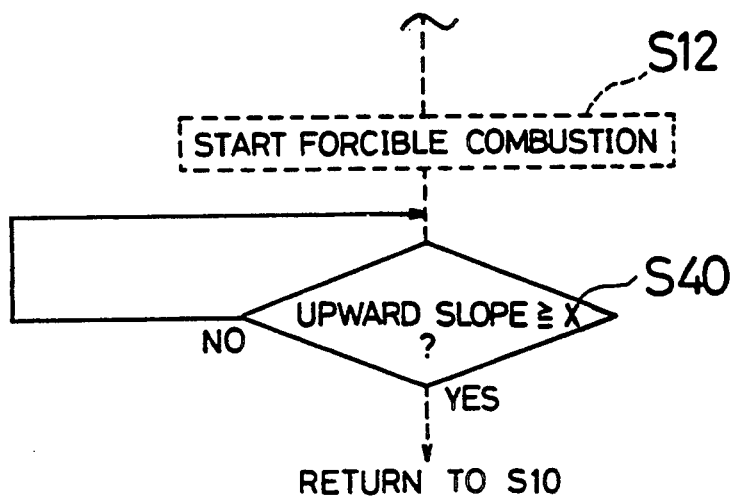

Another combustion control routine is described according to the flowchart of FIG. 3A, which includes step S30 in place of step S13 of FIG. 2A. When forcible combustion starts at step S12, the program proceeds to step S30 at which the combustion controller 40 waits until a predetermined time T elapses after the start of forcible combustion, and then returns to step S10 of FIG. 2A. For example, in the temperature-time curve of FIG. 4, the combustion conditions are restored to normal ON/OFF control at a time point B. The pulse combustor 20 continues combustion after the time point B, and stops combustion when the temperature detected by the temperature sensor 11 becomes greater than 182° C.

A still another combustion control routine is described according to the flowchart of FIG. 3B, which includes step S40 in place of step S13 of FIG. 2A. When forcible combustion starts at step S12, the program proceeds to step S40 at which the upward slope (°C./second) of the temperature detected at a fixed cycle becomes equal to or greater than a predetermined limit X. When cold food items are placed into the cooking oil, the oil temperature drops abruptly in the first stage, but forcible combustion gradually reduces the downward slope in temperature and finally raises the temperature. When the upward slope of the oil temperature reaches the predetermined limit X, the program returns to step S10 of FIG. 2A for restoration of normal ON/OFF control. In the embodiment, the predetermined limit X is set to a very small positive value substantially equal to zero. The combustion controller 40 thus instructs the pulse combustor 20 to resume normal ON/OFF control when the temperature curve goes upward. For example, in the temperature-time curve of FIG. 4, the combustion conditions are restored to normal ON/OFF control at a time point C. The pulse combustor 20 continues combustion after the time point C, and stops combustion when the temperature detected by the temperature sensor 11 becomes greater than 182° C.

Figure 5:
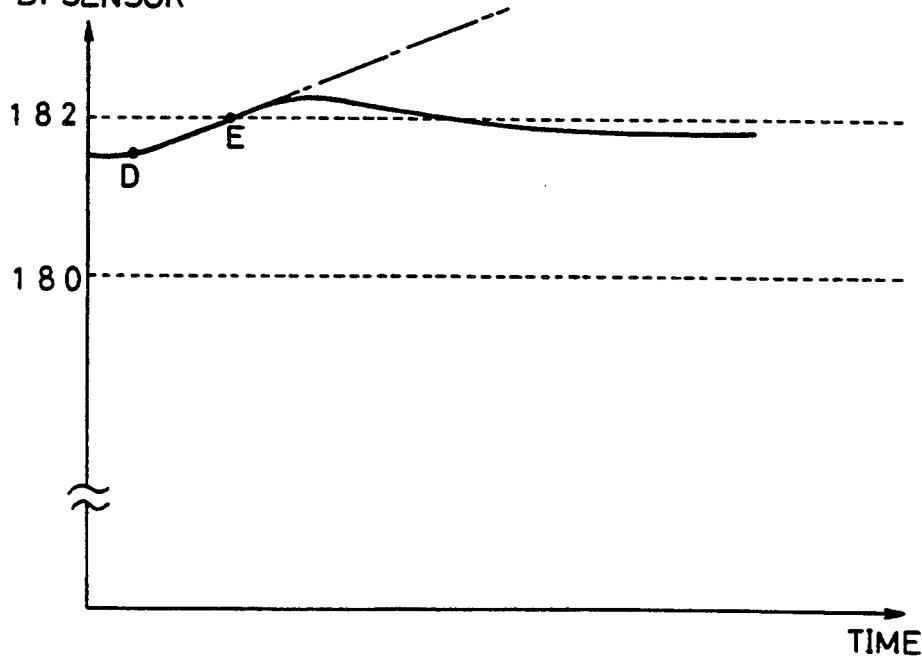
FIG. 5 is a graph showing the temperature change detected by the temperature sensor of FIG. 1 when the restoration step of FIG. 3B is executed.

Even when forcible combustion is started without food items by mis-operation of the forcible combustion switch 41, the system of the embodiment stops forcible combustion based on the upward slope in temperature and efficiently prevents overheat of the cooking oil. In the conventional system, when forcible combustion starts mistakenly without food items, the oil temperature increases to overheat as shown by the one-dot chain line of FIG. 5. In the system of the embodiment, on the contrary, the combustion controller 40 determines restoration to normal ON/OFF control based on the upward slope of the oil temperature. For example, in the temperature-time curve of FIG. 5, the combustion conditions are restored to normal ON/OFF control at a time point D, and combustion stops at a time point E. Dangerous overheat of cooking oil is thus efficiently and securely prevented.

When the temperature detected by the temperature sensor 11 fluctuates, the combustion controller 40 executes the combustion control routine based on the mean temperature to prevent mis-detection of the upward slope.

Since there may be many modifications, alterations, and changes without departing from the scope or spirit of essential characteristics of the invention, it is clearly understood that the above embodiments are only illustrative and not restrictive in any sense. For example, the structure of the invention is applicable to various cooking apparatus or cookers other than fryer apparatus of the embodiment. These cooking apparatus or cookers may include as a heat source a Bunsen burners or an electric heater in place of the pulse combustor of the embodiment.

What is claimed is:

1. A cooker for cooking food items in a cooking medium, said cooker comprising
   heating means for heating said cooking medium to within a predetermined temperature range,
   temperature detecting means for detecting temperature of said cooking medium,
   temperature control means for controlling said heating means to start and stop heating based on the temperature of said cooking medium detected by said temperature detecting means so as to maintain said cooking medium within said predetermined temperature range;
   forcible heating control means for controlling said heating means to start forcible heating of said cooking medium irrespective of the temperature of said cooking medium as detected by said temperature detecting means; and
   temperature control resumption means connected with said temperature control means and with said forcible heating control means for producing a signal in response to the temperature of said cooking medium to stop forcible heating and start heating based on the temperature of said cooking medium.

2. A cooker in accordance with claim 1, wherein said temperature control resumption means produces said signal when the temperature in said cooking medium drops below said predetermined range after start of forcible heating.

3. A cooker in accordance with claim 1, wherein said temperature control resumption means produces said signal when the temperature increase per unit time in said cooking medium becomes equal to or greater than a predetermined limit after start of forcible heating.

4. A cooker for cooking food items in a cooking medium, said cooker comprising
   heating means for heating said cooking medium to within a predetermined range,
   temperature detecting means for detecting temperature of said cooking medium,
   temperature control means for controlling said heating means to start and stop heating based on the temperature of said cooking medium detected by said temperature detecting means so as to maintain said cooking medium within said predetermined temperature range,
   temperature change detecting means for detecting a temperature decrease per unit time in said cooking medium,
   instruction means for outputting a first control signal to said heating means to start forcible heating of said cooking medium irrespective of the temperature of said cooking medium as detected by said temperature detecting means when said temperature decrease per unit time detected by said temperature change detecting means becomes equal to or greater than a predetermined first limit, and
   temperature control resumption means connected with said temperature control means and with said instruction means for producing a second control signal in response to the temperature of said cooking medium to stop forcible heating and start heating based on the temperature of said cooking medium.

5. A cooker in accordance with claim 4, wherein said temperature control resumption means produces said second control signal when the temperature in said cooking medium drops below a predetermined value after start of forcible heating.

6. A cooker in accordance with claim 4, wherein said temperature control resumption means produces said second control signal when a preset time period has elapsed since the start of forcible heating.

7. A cooker in accordance with claim 4, wherein said temperature control resumption means produces said second control signal when the temperature increase per unit time in said cooking medium becomes equal to or greater than a predetermined second limit after start of forcible heating.

8. In a cooker for cooking food items in a cooking medium, said cooker including
   heating means for heating said cooking medium to within a predetermined temperature range,
   temperature detecting means for detecting temperature of said cooking, and
   temperature control means for controlling said heating means to start and stop heating based on the temperature of said cooking medium detected by said temperature detecting means so as to maintain said cooking medium in a predetermined temperature range,
   the further improvement comprising
   forcible heating control means for controlling said heating means to start forcible heating irrespective of the temperature of said cooking medium detected by said temperature detecting means, and
   temperature control resumption means connected with said temperature control means and with said forcible heating control means for producing a signal in response to the temperature of said cooking medium to stop forcible heating and start heating based on the temperature of said cooking medium.

9. A cooker according to claim 8, wherein said temperature resumption control means produces said signal when the temperature in said cooking medium drops below a predetermined value after start of forcible heating.

10. A cooker according to claim 8, wherein said temperature control resumption means produces said signal when the temperature increase per unit time in said cooking medium becomes equal to or greater than a predetermined limit after start of forcible heating.

11. In a cooker for cooking food items in a cooking medium including
    heating means for heating said cooking medium to within a predetermined temperature range, temperature detecting means for detecting temperature of said cooking medium, and temperature control means for controlling said heating means to start and stop heating based on the temperature of said cooking medium detected by said temperature detecting means so as to maintain said cooking medium in a predetermined temperature range, the further improvement comprising A. temperature change detecting means for detecting a temperature decrease per unit time in said cooking medium, B. instruction means for outputting a first control signal to said heating means to start forcible heating irrespective of the temperature of said medium detected by said temperature detecting means when said temperature decrease per unit time detected by said temperature change detecting means becomes equal to or greater than a predetermined first limit, and temperature control resumption means connected with said temperature control means and with said instruction means for producing a second control signal in response to the temperature of said cooking medium to stop forcible heating and start heating based on the temperature of said cooking medium.

12. A cooker according to claim 11, wherein said temperature control resumption means produces said second control signal when the temperature in said cooking medium drops below a predetermined value after start of forcible heating.

13. A cooker according to claim 11, wherein said temperature control resumption means produces said second control signal when a preset time period has elapsed since the start of forcible heating.

14. A cooker according to claim 11, wherein said temperature control resumption means produces said second control signal when the temperature increase per unit time in said cooking medium becomes equal to or greater than a predetermined second limit after start of forcible heating.

15. In a fryer apparatus for deep frying food items in cooking oil, said fryer apparatus having a frypot filled with said cooking oil, a pulse combustor for heating said cooking oil in said frypot, a temperature sensor for detecting temperature of said cooking oil, and a combustion controlling unit for controlling said pulse combustor, said combustion controlling unit further having the improvement comprising A. temperature control means for controlling said pulse combustor to start and stop combustion based on the temperature of said cooking oil detected by said temperature sensor so as to maintain said cooking oil in a predetermined temperature range, B. forcible combustion control means for controlling said pulse combustor to start forcible combustion irrespective of the temperature of said cooking oil detected by said temperature sensor, and C. temperature control resumption means connected with said temperature control means and with said forcible combustion control means for producing a signal in response to the temperature of said cooking oil to stop forcible combustion and start combustion based on the temperature of said cooking oil.

16. A fryer apparatus according to claim 15, wherein said temperature control resumption means produces said signal when the temperature in said cooking oil drops below a predetermined value after start of forcible combustion.

17. A fryer apparatus according to claim 15, wherein said temperature control resumption means produces said signal when a preset time period has elapsed since the start of forcible combustion.

18. A fryer apparatus according to claim 15, wherein said temperature control resumption means produces said signal when the temperature increase per unit time in said cooking oil becomes equal to or greater than a predetermined limit after start of forcible combustion.

* * * * *